UNITED STATES PATENT OFFICE.

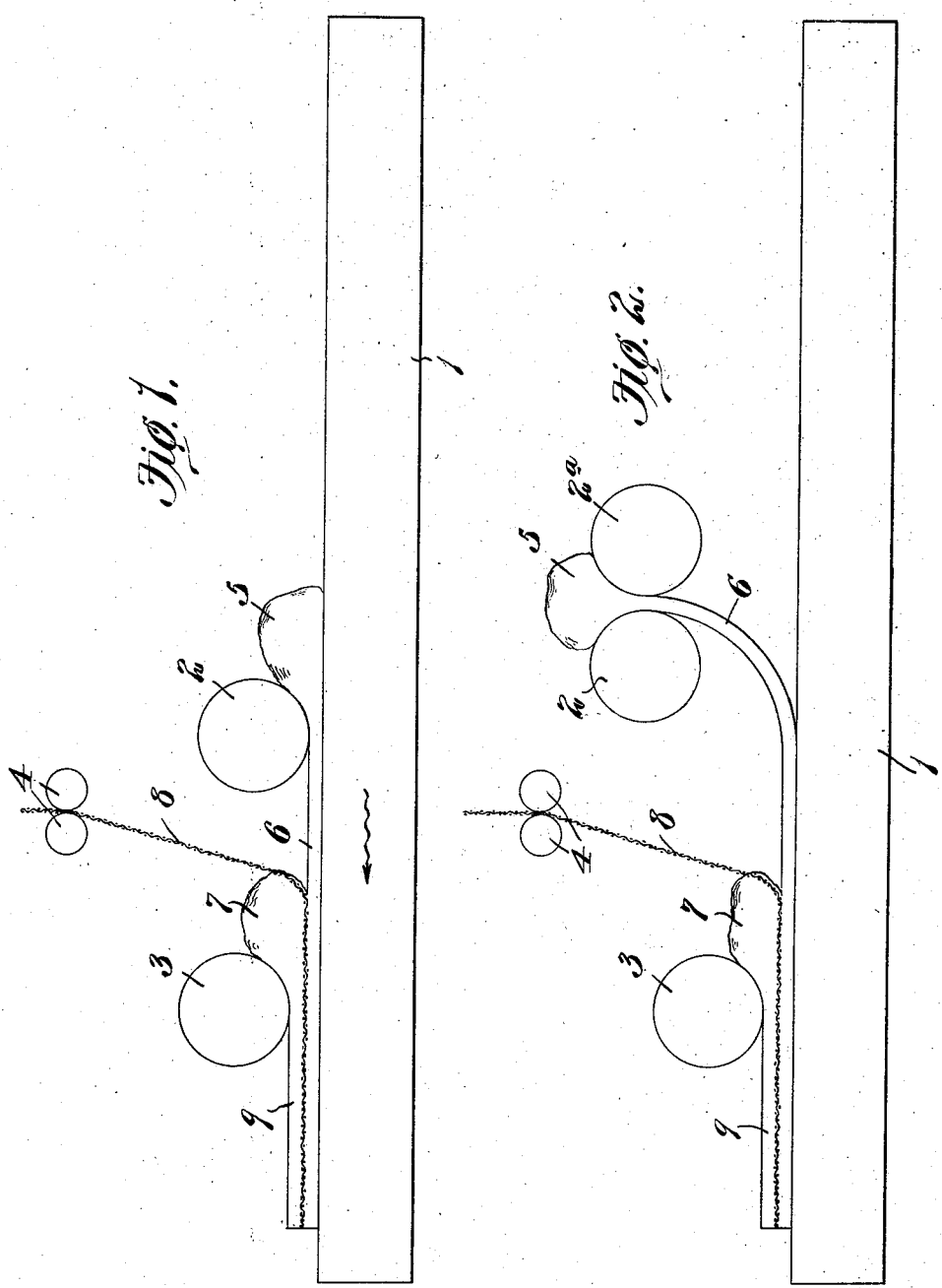

ROBERT A. B. WALSH, OF ST. LOUIS, MISSOURI.

METHOD OF AND MACHINE FOR MAKING WIRE-GLASS.

940,840.  Specification of Letters Patent.  Patented Nov. 23, 1909.

Application filed December 2, 1907. Serial No. 404,848.

*To all whom it may concern:*

Be it known that I, ROBERT A. B. WALSH, a citizen of the United States, residing at St. Louis, Missouri, have invented certain new and useful Improvements in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1 and 2 are side elevations of different forms of apparatus which may be used in practicing my invention.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original bright and new appearance after it has been embedded in the glass.

In the manufacture of wire glass, the tendency of the wire is to contract and "draw" the glass so as to produce an uneven or an irregular surface. It has been proposed, see for illustration the patent to Walsh No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first mentioned. In both of these methods, the wire, on account of its exposure to atmosphere after being heated, loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, the method herein described consists in first forming a layer or sheet of glass, then spreading a mass of molten glass over the upper surface of said layer to form a finishing coating therefor, and drawing a wire mesh into the mass of molten glass that is spread over the upper surface of said layer, the wire mesh being completely covered as soon as it comes in contact with the molten glass so that it will not be exposed to atmosphere while in its heated condition, and accordingly it will preserve its bright and new appearance in the finished product.

It is obvious that my method can be practiced with various types of apparatus and I have herein shown two forms of apparatus for carrying out my method, that in Fig. 1 comprising a table 1 having a smooth surface roller 2 arranged above the upper surface thereof and adapted to coöperate with the table to form a mass of molten glass into a bottom layer, and a smooth surface roller 3 arranged above the table at a distance equal to the thickness of the finished product and adapted to spread a mass of molten glass over the upper surface of said bottom layer to form a finishing coating therefor, said apparatus also comprising a pair of tension rolls 4 which are so located relatively to the roller 3 that the wire mesh which passes through said rolls will cut its way into the mass of molten glass which forms the finishing coating for the bottom layer at the same time said mass is being spread over the bottom layer.

In practicing my method with apparatus of this description, a mass of molten glass 5 is dumped onto the table adjacent the roller 2 and the table is then moved in the direction of the arrow to cause said mass of molten glass to be formed into a bottom layer 6. When the front end of said layer reaches the roller 3 a second mass of molten glass 7 is dumped onto said layer and a wire mesh 8 which passes through the tension rolls 4 is interposed between said mass 7 and the upper surface of the bottom layer, the continued movement of the table causing said mass to be spread over the bottom layer to form a finishing coating 9. The tension rolls 4 cause the wire mesh to cut its way into the mass of molten glass 7 simultaneously with the operation of forming said mass into a finishing coating or top layer so that the wire mesh will be completely covered by glass while in its heated condition and thus be prevented from oxidizing as would be apt to occur if it were exposed to the air while in its heated condition. Although I have previously stated that the table is moved longitudinally it will, of course, be understood that the table could be stationary and the rollers and tension rolls be moved longitudinally thereof without departing from the spirit of my invention.

In Fig. 2 I have shown another form of apparatus for practicing my method which is similar to the apparatus shown in Fig. 1 except that the bottom layer 6 is formed between smooth surface rolls 2 and 2ª.

Having thus described my invention, what I claim as new and desire to secure by Letters Patent is:

1. An apparatus for making wire glass, comprising means for forming a mass of molten glass into a bottom layer, means for spreading a mass of molten glass over said bottom layer to form a finishing coating therefor, and means for drawing a wire mesh into the mass of molten glass which forms the finishing coating at the same time said mass is being spread over the bottom layer; substantially as described.

2. An apparatus for making wire glass, comprising means for forming a bottom layer or sheet, means for spreading a mass of molten glass over said sheet to form a finishing coating therefor, and tension devices for drawing a wire mesh into said mass as it is being spread over the bottom layer; substantially as described.

3. An apparatus for making wire glass, comprising means for rolling a mass of molten glass into a bottom layer or sheet, a roller for spreading a mass of molten glass over the upper surface of said sheet to form a finishing coating therefor, and tension rolls so disposed relatively to said roller that a wire mesh is caused to cut its way into said mass of molten glass as it is being spread over the bottom layer; substantially as described.

4. An apparatus of the character described, comprising a table, a roller arranged above said table and adapted to coöperate therewith to form a mass of molten glass into a bottom layer, a second roller arranged above the table at a distance equal to the thickness of the finished product for spreading a mass of molten glass over the bottom layer, and tension devices for drawing the wire mesh into the mass of molten glass which is spread over the bottom layer; substantially as described.

5. The method of making wire glass, which consists in forming a sheet or layer of glass, spreading a mass of molten glass over the upper surface of said sheet or layer, and drawing a wire mesh into said mass as it is being spread over the bottom layer; substantially as described.

6. The method of making wire glass, which consists in rolling a mass of molten glass into a bottom layer or sheet, progressively spreading a second mass of molten glass over the upper surface of said bottom layer to form a finishing top layer, and simultaneously drawing a wire mesh into the underneath surface of said finishing top layer so that it is completely covered; substantially as described.

7. The method of making wire glass, which consists in forming a sheet or layer of glass, arranging one end of a wire mesh upon said layer, dumping a mass of molten glass upon the end of said wire mesh and spreading it over the upper surface of said sheet or layer, and subjecting said wire mesh to tension so that it will cut its way into the mass of glass that is spread over the upper surface of said layer; substantially as described.

In testimony whereof I hereunto affix my signature in the presence of two witnesses, this twenty-sixth day of November 1907.

ROBERT A. B. WALSH.

Witnesses:
F. R. CORNWALL,
GEORGE BAKEWELL.